United States Patent [19]

Blume

[11] 3,716,522

[45] Feb. 13, 1973

[54] AMIDE ACETAL INITIATED CHLORAL POLYMERIZATION PROCESS

[75] Inventor: Roe C. Blume, Wilmington, Del.

[73] Assignee: E. I. du Pont de Nemours and Company, Wilmington, Del.

[22] Filed: Nov. 12, 1970

[21] Appl. No.: 89,135

[52] U.S. Cl..................260/64, 260/67 R, 260/67 S, 260/67 UA, 260/79, 260/874
[51] Int. Cl..............................C08g 1/18, C08g 3/00
[58] Field of Search..................260/67 R, 64, 67 S, 67 U, 77.5 R, 79, 874

[56] References Cited

UNITED STATES PATENTS

| | | | |
|---|---|---|---|
| 3,254,052 | 5/1966 | McCain et al. | 260/67 |
| 3,278,490 | 10/1966 | Rosen et al. | 260/67 |
| 3,454,527 | 7/1969 | Vogl | 260/67 |

*Primary Examiner*—William H. Short
*Assistant Examiner*—L. L. Lee
*Attorney*—James A. Costello

[57] ABSTRACT

Disclosed herein is a process for making chloral homopolymers, and copolymers with, for instance, isocyanates and ketenes, at temperatures between about 0° and 60° C. employing amide acetal initiators, and for making composites thereof with ethylenically unsaturated free-radical catalyzed polymers. The polymers are useful, inter alia, in building-product applications.

22 Claims, No Drawings

AMIDE ACETAL INITIATED CHLORAL POLYMERIZATION PROCESS

BACKGROUND OF THE INVENTION

1. Field of the Invention

This invention concerns the polymerization of chloral (trichloroacetaldehyde) and the copolymerization thereof with various comonomers, employing amide acetal initiators.

2. Description of the Prior Art

Heretofore, the preferred method for polymerizing chloral polymers and copolymers has been a "cryotachensic" polymerization. That process involves mixing a Lewis base anionic catalyst such as an amine, ammonium or phosphonium compound with, say, chloral, chloral/isocyanate or chloral/-ketene and cooling to a temperature of between about 0° to − 78° C. The present method, employing amide acetal initiators, makes it unnecessary to employ such low temperatures. Special advantages are also realized in the area of spun fibers made from the polymers and copolymers according to the disclosure herein. See, for example, U.S. Pat. application Ser. No. 886,739, filed Dec. 19, 1969, relating to "cryotachensic" polymerization of chloral copolymers.

SUMMARY OF THE INVENTION

The novel process of this invention comprises contacting the chloral monomer alone or together with various comonomers, with an effective amount of an amide acetal initiator, at a temperature of between about 0° to 60° C. The amide acetal initiators contemplated to be used herein are those of the formula:

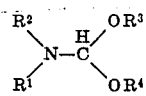

wherein:

$R^1$ and $R^2$ are each lower hydrocarbyl, preferably of up to five carbons, or together form a divalent radical, containing four to five chain atoms, which is hydrocarbyl except that up to two hetero atoms can be nitrogen, oxygen, or sulfur, $R^3$ and $R^4$ are each hydrocarbyl, preferably of less than eight carbons, or together form a divalent radical containing two to three chain atoms, or are recurring units having an oxygen and up to eight carbons, $R^1$ and $R^4$ can form divalent hydrocarbyl radicals of two to three carbons, and $R^2$ and $R^3$ can form divalent hydrocarbyl radicals of two to three carbons.

The preferred amide acetals are those of the formula:

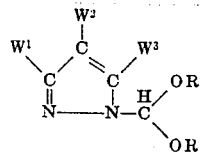

wherein:
R is lower alkyl of one to four carbon atoms, and
$W^1$, $W^2$, $W^3$ are hydrogen or lower alkyl.

The polymerization of chloral monomer or chloral together with various other amide acetal initiated monomers taught herein, can be conducted in the presence of one or more ethylenically unsaturated monomers polymerizable by a free-radical catalyst. The process of this invention includes chloral polymerization carried out in the presence of such monomers. Also included is the subsequent step of polymerizing the free-radical initiated monomers.

The polymerization of the free-radical polymerized monomers is conducted in the presence of the chloral polymers or copolymers. A free-radical catalyst is present and activation is generally by heat or irradiation. Activation by heat is conducted at temperatures above about 60° C. until polymerization is at least substantially complete.

DESCRIPTION OF THE PREFERRED EMBODIMENTS

The chloral polymerization process generally involves mixing the monomer or monomers with the amide acetal initiator at room temperature or between about 0° to 60° C. The polymerization is preferably carried out at between about 0° to 50° C., for example, by mixing initiator with monomers at 40° to 60° C. and cooling to about 0° C. Lower temperatures can be employed but are not necessary. Higher temperatures than about 60° C. are not preferred because they may promote reactions between initiator and monomer. The amide acetal initiators can be employed at levels of 0.005 to 5 mol percent based on the total charge. Generally, however, 0.015 to 2.5 mol percent is used.

Chloral can be used as the only polymerizable monomer. However, it is preferred that comonomers be employed therewith in amounts of up to about 50 percent of total charge based on molecular weight. Chloral copolymers with, for instance, ketenes, isocyanates, diisocyanates, isothiocyanates and diisothiocyanates generally exhibit better tractability and stability than do chloral polymers alone. For instance, heat stability is best when the chloral copolymer contains about 15 to 20 mole percent of one or more of the non-chloral polymerized monomers described herein. The polymerization process taught herein may also be employed to polymerize small amounts of other comonomers such as formaldehyde, for instance, along with the monomers described above.

It has been found that the copolymers generally contain less of the non-chloral component than would be expected from the amounts and ratios of monomers charged. For instance, when 30 percent of an isocyanate is used with 70 percent of chloral, the copolymer will generally have less than about 20 percent of isocyanate component. This is important in determining what monomer charges to make in order to obtain products of specific copolymer molar percentages. In this connection it has been found that acceptable copolymers of chloral/p-chlorophenyl isocyanate are obtained from charges of about 60 to 80 mole percent chloral and 40 to 20 percent of the p-chlorophenylisocyanate.

Some of the monomers suitable for copolymerization with chloral are

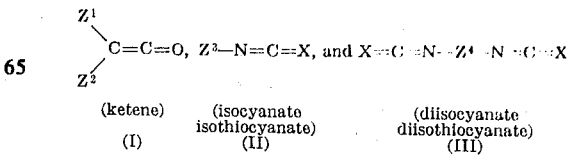

wherein:

X is selected from the group consisting of oxygen and sulfur;

$Z^1$ and $Z^2$, alike or different and separately or jointly, are selected from the group consisting of (1) monovalent groups selected from the group consisting of hydrogen, cyano, lower alkoxycarbonyl, and unsubstituted and substituted hydrocarbyl and hydrocarbyloxy in which any hydrocarbyl moiety is of 1 to 18 carbon atoms selected from the group consisting of alkyl, cycloalkyl, alkenyl, aryl, aralkyl and alkaryl, and any substituent is selected from the group consisting of lower-alkoxy, fluorine, chlorine, bromine, and iodine; and (2) divalent groups selected from alkylene of two to seven carbons;

$Z^3$ is selected from the group consisting of nonsubstituted and substituted alkyl, cycloalkyl, and alkenyl of up to 18 carbons, aryl of six to 18 carbons and alkaryl and aralkyl of seven to 24 carbons, any substitution being selected from the group consisting of fluorine, chlorine, bromine, iodine, nitro, cyano, phenylazo, —$NY_2$, —OY, —SY,

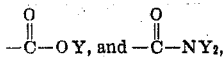

in which Y is lower alkyl or phenyl; and $Z^4$ is selected from the group consisting of nonsubstituted and substituted alkylene, alkenylene, alkadienylene, alkarylene, aralkylene, cycloalkylene, alkylenebis-(cycloalkylene), alkylenebis(arylene), arylene, arylenebis-(alkylene) of up to 18 carbons and anthraquinonylene, any substitution being selected from the group consisting of fluorine, chlorine, bromine, iodine, nitro, cyano, phenylazo, —OY, —SY,

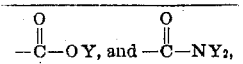

in which Y is loweralkyl or phenyl.

It should be understood that more than one compound of formulas (I), (II), or (III) can be polymerized simultaneously with chloral in preparing the polymers of this invention.

When the following isocyanates, diisocyanates, isothiocyanates and diisothiocyanates are used in the procedures of the Examples, the corresponding chloral/isocyanate polymers are obtained.

methoxydifluoromethyl isocyanate;
4-ethylphenyl(1,1-dimethylethyl)isocyanate;
2-benzo[b]thien-3-yl-1-methylethyl isocyanate;
1,5-naththylene diisocyanate; p-(bis-(2-chloroethyl)amino)phenyl isocyanate;
ethoxycarbonylmethyl isocyanate;
3-cyano-1-methyl-3,3-diphenylpropyl isocyanate;
o-cyanophenyl isocyanate;
1-diethylamino-1,2,2-trifluoroethyl isocyanate; α,α-diethylphenethyl isocyanate;
heptafluoropropyl isocyanate;
2-iodo-1-indanyl isocyanate;
cis,cis-9,12-octadecadienyl isocyanate;
4-phenylanthryl isocyanate;
2,6-anthraquinonylene diisocyanate;
3-benzyloxy-4-methoxyphenethyl isocyanate;
1-cyclohexenyl isocyanate;
trifluoromethyl isocyanate;
1,2,3,4,4a,9,10,10a-octahydro-7-isopropyl-1,4a-dimethyl-1-phenanthryl isocyanate;
2,4,6-triiodophenyl isocyanate;
abietyl isocyanate;
6-fluoro-2-pyridyl isocyanate;
styryl isocyanate;
1-phenylvinyl isocyanate;
1,3-butadienylene diisocyanate;
1-adamantyl isocyanate;
3,3,3-trinitropropyl isocyanate;
2-(phenylthio)ethyl isocyanate;
p-phenylazophenyl isocyanate;
allyl isothiocyanate;
benzyl isothiocyanate;
butyl isocyanatoacetate;
p-bromophenyl isothiocyanate;
p-butoxyphenyl isothiocyanate;
o-chloro-α-phenylbenzyl isothiocyanate;
14-cyanotetradecyl isothiocyanate;
cyclohexyl isothiocyanate;
cyclooctyl isothiocyanate;
2-diethylaminethyl isothiocyanate;
2,2-difluoroethyl isothiocyanate;
2,4-dinitrophenyl isothiocyanate;
ethylene diisothiocyanate;
p-iodophenyl isothiocyanate;
4-methylthiobutyl isothiocyanate;
p-phenylene diisothiocyanate;
2-pyridyl isothiocyanate;
p-(methylthio)phenyl isothiocyanate; and
9-phenanthryl isothiocyanate.

When the following ketenes are used in the procedure of the Examples, the corresponding chloral/ketene addition polymers are obtained:

ketene;
methylketene;
dimethylketene;
phenoxyketene;
p-chlorophenoxyketene;
2,4-dichlorophenoxyketene;
2,4,6-trichlorophenoxyketene;
diphenoxyketene;
bis(p-biphenylyl)ketene;
di-p-tolylketene;
dimesitylketene;
dodecylethylketene;
durylphenylketene;
tetradecylketene;
octadecylketene;
benzylmethylketene;
cyclohexylketene;
dimethyleneketene (carbonylcyclopropane);
tetramethyleneketene (carbonylcyclopentane);
isopropenylketene;
vinylketene;
diallylketene;
7-hexadecenylketene;
(1-naphthyl)phenylketene;
3,3,3-trichloropropylketene;
p-methoxyphenylketene;
dicyanoketene (carbonylmalononitrile);
(ethoxycarbonyl)ketene (ethyl 3-oxoacrylate);
and (ethoxycarbonyl)-p-tolylketene (ethyl 3-oxo-2-p-tolylacrylate).

SPECIFIC EMBODIMENTS

The following Examples are illustrative of the invention. They are non-limiting and are included within the broad scope of the invention.

EXAMPLES 1 to 26

The polymers were prepared as follows: The monomer (or monomers), 0.1 M, was placed in a stoppered 30-ml. test tube which had been flamed and cooled under $N_2$, warmed to 55° C and the initiator added. The mixture was cooled to 0° C and allowed to polymerize. After 15–24 hr., the product was cracked from the sides of the tube by cooling in liquid nitrogen and pulverized by placing in a tooth paste tube, cooling again with liquid nitrogen, and subjecting to a sharp blow with a hammer. The product was dissolved in chloroform, filtered, and evaporated. Unconverted monomers and other $CHCl_3$-soluble impurities were removed by washing with acetone and methanol. The product was dried in air or vacuum. In certain cases, the final polymer washing was with three portions of hot acetone, a procedure which removes a substantial amount of low polymer as well as other impurities.

In these Examples, unless otherwise specified, the remainder of the monomer charge is p-chlorophenyl isocyanate.

EXAMPLES 1-26

| EX. NO. | CHLORAL % | MOL % INITIATOR | $R^1$ | $R^2$ | $R^3$ | $R^4$ |
|---|---|---|---|---|---|---|
| 1 | 70 | 0.085 | $CH_3$ | $CH_3$ | $CH_2CMe_3$ | $CH_2CMe_3$ |
| 2 | 70 | 0.04 | $CH_3$ | $CH_3$ | $CH_2CMe_3$ | $CH_2CMe_3$ |
| 3 | 70 | 1.8 | $CH_3$ | $CH_3$ | tBu | tBu |
| 4 | 70 | 0.8 | $CH_3$ | $CH_3$ | tBu | tBu |
| 5 | 70 | 0.25 | $CH_3$ | $CH_3$ | tBu | tBu |
| 6 | 70 | 0.1 | $CH_3$ | $CH_3$ | tBu | tBu |
| 7 | 70 | 0.015 | $CH_3$ | $CH_3$ | tBu | tBu |
| 8 | 70 | 0.15 | $CH_3$ | $CH_3$ | $CH_3$ | $CH_3$ |
| 9 | 70 | 2. | $CH_3$ | $CH_3$ | $C_2H_5$ | $C_2H_5$ |
| 10 | 70 | 0.1 | $CH_3$ | $CH_3$ | $CH_2C_6H_5$ | $CH_2C_6H_5$ |
| 11 | 70 | 0.25 | $CH_3$ | $CH_3$ | $C_6H_{11}$ | $C_6H_{11}$ |
| 12 | 70 | 0.04 | $CHMe_2$ | $CHMe_2$ | $CH_2CMe_3$ | $CH_2CMe_3$ |
| 13 | 70 | 0.5 | $CH_3$ | $CH_3$ | $- CH_2CH_2 -$ | |
| 14 | 70 | 0.1 | $CH_3$ | $CH_3$ | $- CH_2CMe_2CH_2 -$ | |
| 15 | 80 | 0.2 | $CH_3$ | $CH_3$ | $- CH_2CMe_2CH_2 -$ | |
| 16 | 70 | 0.2 | $C_2H_5$ | $C_2H_5$ | $-CH_2-C-CH_2-$ with $H_2C$, $CH_2$, O, O, $CHNMe_2$ | |
| 17 | 70 | 0.4 | $C_2H_5$ | $C_2H_5$ | | |
| 18 | 70 | 0.8 | $C_2H_5$ | $C_2H_5$ | | |
| 19 | 70 | 2.4 | $- N=CMe-CH=CMe -$ | | $CH_3$ | $CH_3$ |
| 20 | 70 | 1.2 | $- N=CMe-CH=CMe -$ | | $CH_3$ | $CH_3$ |
| 21 | 70 | 0.6 | $- N=CMe-CH=CMe -$ | | $CH_3$ | $CH_3$ |
| 22 | 60 | 0.15 | $- N=CMe-CH=CMe -$ | | $CH_3$ | $CH_3$ |
| 23 | 100 | 0.6 | $- N=CMe-CH=CMe -$ | | $CH_3$ | $CH_3$ |
| 24 | 70 | 0.6 | $- CH=N-CH=CH -$ | | $C_2H_5$ | $C_2H_5$ |
| 25 | 70 | 0.07 | $- CH=N-CH=CH -$ | | $C_2H_5$ | $C_2H_5$ |
| 26 | 70 | 0.1 | $- CH_2CH_2OCH_2CH_2 -$ | | $CH_3$ | $CH_3$ |

INITIATOR NAMES

| Example No. | Name |
| --- | --- |
| 1–2 | dimethylformamide dineopentyl acetal |
| 3–7 | dimethylformamide di-t-butyl acetal |
| 8 | dimethylformamide dimethyl acetal |
| 9 | dimethylformamide diethyl acetal |
| 10 | dimethylformamide dibenzyl acetal |
| 11 | dimethylformamide dicyclohexyl acetal |
| 12 | diisopropylformamide dineopentyl acetal |
| 13 | dimethylformamide, cyclic ethylene acetal (or 2-N,N-dimethylamino-1,3-dioxolane) |
| 14–15 | dimethylformamide, cyclic 2,2-dimethyl-1,3-propylene acetal (or 2-N,N-dimethylamino-5,5-dimethyl-1,3-dioxane) |
| 16–18 | 3-N-dimethylamino-9-N-diethylamino-2,4,8,10-tetraoxaspiro[5,5]undecane |
| 19–23 | dimethoxy-3,5-dimethyl-1-pyrazolylmethane |
| 24–25 | diethoxy-1-pyrrolylmethane |
| 26 | dimethoxy-N-morpholinomethane |

EXAMPLE 27

When 1 mol. percent of 2,3,5,6-tetrahydrooxazola-oxazole of the following formula was used:

$$\begin{array}{c} CH_2 \\ CH_2 \diagup \diagdown O \\ | \quad \quad \quad | \\ N\text{-----}C\text{---}H \\ | \quad \quad \quad | \\ \diagdown \diagup O \\ CH_2\text{---}CH_2 \end{array}$$

wherein for the formula given:
$R^2 + R^3$ and $R^1 + R^4$ are $-CH_2-CH_2$,
the product obtained by precipitation in hexane had an inherent viscosity of about 0.1.

EXAMPLE 28

When 0.015, 0.03, 0.06 and 0.12 mol. percent of the polymeric amide acetal of the following formula was used:

$$(((CH_2)_4O)_{50}-CH(NMe_2)-O)_n$$

wherein for the formula given:
$R^1$ and $R^2 = CH_3$,
$R^3$ and $R^4$ are $((CH_2)_4O)_{50}$,
polymer of inherent viscosity of 0.28 to 0.15 resulted.

EXAMPLE 29

When 0.4, 0.8, 1.6 and 3.2 mol. percent of the polymeric amide acetal of the following formula was used:

$$\left( O\text{---}CH \begin{array}{c} CMe_2 \\ \diagup \diagdown \\ \diagdown \diagup \\ CMe_2 \end{array} CH\text{---}O\text{---}C\text{---} \begin{array}{c} H \\ | \\ NMe_2 \end{array} \right)_n$$

wherein for the given formula:
$R^1$ and $R^2 = CH_3$, and
$R^3$ and $R^4$ are the $$\left( -CH \begin{array}{c} CMe_2 \\ \diagup \diagdown \\ \diagdown \diagup \\ CMe_2 \end{array} CH\text{---}O\text{---} \right)$$

recurring units,
the polymer obtained had an intrinsic viscosity of between about 0.33 and 0.43.

EXAMPLE 30

When the general procedure was repeated except the initiator had the formula:

$$\left( \begin{array}{c} (CH_2)_8O\text{---}CH\text{---}O \\ | \\ NMe_2 \end{array} \right)_n$$

wherein for the given formula:
$R^1$ and $R^2 = CH_3$,
$R^3$ and $R^4$ are units $-(CH_2)_8O-$,
the polymer obtained with 0.035 mol. percent had an intrinsic viscosity of 0.45.

EXAMPLE 31

To a dry test tube under a nitrogen atmosphere was introduced at 60° C 1.25 ml of chloral, 0.2 ml of diphenyl ketene, 0.1 ml of acetonitrile, and 0.1 mole percent of dimethylformamide neopentyl acetal (see Examples 1–2). The mixture was cooled in an ice bath; polymerization to a gel required about 5–6 seconds. The temperature was maintained at 0° C. for 3 hrs. and 21° C. for 16 hrs. After removal of volatiles by baking, there was obtained a 94–97 percent yield of polymer. It underwent a weight loss of 10 percent at 100° C. after 9 days.

EXAMPLE 32

A solution of 8 ml of toluene, 3 ml of chloral, 0.75 ml of butyl ethyl ketene and 18 μl of dimethylformamide neopentyl acetal was cooled to 0°. It gelled in about 30 seconds. After 3 hours at 0° the polymer was washed with methanol and dried to give a 25 percent yield of copolymer.

THE INITIATORS

The amide acetal initiators are obtainable by the synthetic procedures shown in the following equations:

A. $ROH + (MeO)_2CHNMe_2 \rightarrow (RO)_2CHNMe_2$
B. $R_2NH + (R^1O)_2CHNMe_2 \rightarrow (R^1O)_{2\,CHNR_2} + HNMe_2$
C. $R_2NCHO + COF_2 \rightarrow R_2NCHF_2 \xrightarrow{R^1OMe} R_2NCH(OR^1)_2$
D. $R_2NCHO + COCl_2 \rightarrow R_2NCHCl_2 \xrightarrow{R^1O-Na} R_2NCH(OR^{DA})_2$
E. $R_2NCHO + (MeO)_2SO_2 \longrightarrow$ $$R_2N\text{---}CH\text{---}OSO_3Me \xrightarrow{MeONa} R_2NCH(OMe)_2$$
$$\quad \quad \quad |$$
$$\quad \quad \quad OMe$$

F. $R_2NH + HC(OR^1)_3 \rightarrow R_2NCH(OR^1)_2$

G. $R_2NCHO + (MeO)_2SO_2 \longrightarrow R_2N\text{---}CH\text{---}OSO_3Me \xrightarrow{R_2NH}$
$$\quad \quad \quad \quad \quad \quad \quad \quad \quad \quad \quad \quad \quad \quad \quad \quad |$$
$$\quad \quad \quad \quad \quad \quad \quad \quad \quad \quad \quad \quad \quad \quad \quad \quad OMe$$

$$\begin{array}{c} R^2 \\ \diagdown \\ N \\ | \\ HC\text{---}OSO_3Me \\ | \\ N \\ \diagup \\ R^2 \end{array}$$

$$\downarrow R^1ONa(or\ K)$$

$$R^1OCH(NR_2)_2$$

$$\downarrow$$

$$(R^1O)_2CHNR_2 + HC(NR_2)_3$$

The method of Equation A was used to prepare the amide acetals of Examples 1–2, 9–18 and 27–30; Equation B for Example 26; Equation C for Example 8; Equation D for Examples 3–7; and Equation F for Examples 19–25. Alternately, the method of Equation E can be employed to prepare the amide acetals of Example 8 and that of Equation G can be employed to produce the initiators of Examples 24 and 25.

Regarding the pyrazoles useful herein, see also coassigned U. S. Application, filed concurrently herewith in the name of Swiatoslaw Trofimenko, entitled "Alkoxy Pyrazoles," Attorney's Docket No. CR 7069. Described therein, inter alia, are pyrazoles and a process therefor.

The pyrazole of Examples 19 to 23 was prepared in the following manner: 100 g. of 3,6-dimethylpyrazole, 200 g. of trimethyl orthoformate and 1 g. of p-toluenesulfonic acid was heated until methanol ceased to distill. Solid $K_2CO_3$ was added and dimethoxy-3,5-dimethyl-1-pyrazolylmethane obtained by distillation at 54°–60°/1.1 mm. In a similar manner 1-diethoxymethyl-pyrazole (°,60°/2.5 mm.) was obtained. 1,1-Dimethoxy-1-pyrazol-1-ylethane and 1,1-dimethoxy-1-benzylpyrazole resulted from reaction of pyrazole with trimethyl orthoacetate and trimethyl orthobenzoate.

By the substitution of various heterocyclic compounds having hydrogen on nuclear nitrogen, first column below, for the 3,5-dimethylpyrazole, corresponding amide acetals, second column, are prepared:

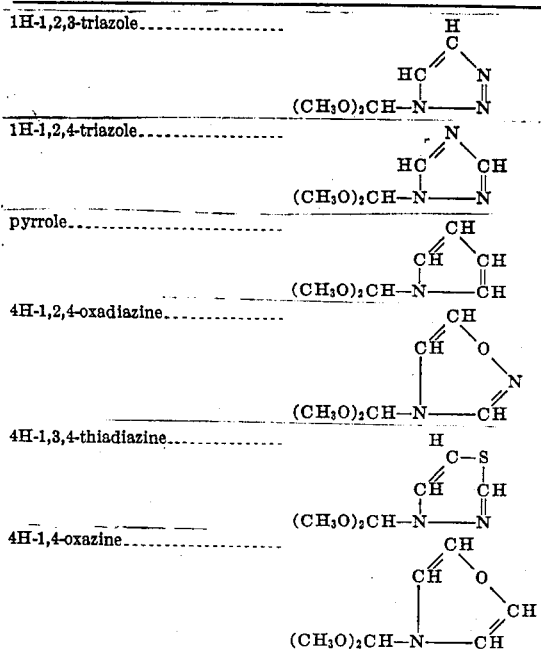

When other orthoformates or orthoesters are substituted for the trimethyl orthoformate, similar dialkoxy-1-heterocycloalkanes or other derivatives are produced. For further discussion, see coassigned U. S. application referred to above.

The polymers and copolymers made according to the process of this invention, employing amide acetal initiators, are particularly useful for making spun fibers. When these initiators are used, and in particular, those from amide acetals having a pyrazolyl group, polymers soluble in dimethyl-formamide, toluene, xylene, chloroform and similar solvents are obtained. The fibers can be dry spun from solutions, for example, in toluene. Spinning of a solution of the chloral polymer dissolved in an aromatic hydrocarbon solvent using a less effective aliphatic solvent gave continuous fibers. Preferred conditions are to spin 8–12 percent chloral/isocyanate copolymer of inherent viscosity 1.6–1.7 in toluene or 20 percent copolymer of inherent viscosity of about 1.0 into ethyl acetate or ethyl acetate/acetone mixtures. The fibers obtained have a modulus of 18g/denier and tensile of 0.5g/denier at 20–100 percent elongation. They are useful in fabrics that may be subjected to elevated temperatures.

A unique property of the polymers obtained by use of amide acetal initiators is that even those with a high chloral content can be melt pressed into films and similar objects. Homopolymers as well as copolymers containing 12 to 20 percent isocyanate are generally heat formable at about 180° to 250° C. When subjected to temperatures of about 100° C. for extended periods of time, the polymers made according to the process of this invention develop less discoloration and weight loss than polymers prepared by prior art methods.

The chloral polymers and copolymers made herein are particularly useful for providing single-phase composites when combined, according to the teaching of this invention, with addition polymers of polymerized ethylenically unsaturated monomers. For a further discussion of these composites, see coassigned U.S. application Ser. No. 42,877, filed Jun. 2, 1970.

PREPARATION OF COMPOSITES

The novel process of this invention further comprises the polymerization of a mixture of (1) chloral either alone or, optionally, with 0.5 to 40 mol percent, based on chloral, of a ketene or isocyanate, and an amide acetal initiator, and (2) an ethylenically unsaturated free-radical addition polymerizable monomer (present in an amount less than chloral in a weight basis) with a free-radical polymerization catalyst. Most useful of the latter class of monomers are compounds that are liquids at temperatures above about 50° C. and give high molecular weight solid polymers with a peroxy or azo catalyst. The preferred monomers are acrylic and methacrylic esters of lower alkanols and vinyl esters of lower alkanoic acids, e.g., methyl methacrylate, methyl acrylate, and vinyl acetate.

The following examples further illustrate the preparation of these multi-component polymeric composite compositions:

EXAMPLE A

The following mixture of
22 ml. of chloral
1.38 ml. of diphenylketene (3 mol percent, based on chloral)
13.75 ml. of methyl methacrylate
0.22 g. of azodiisobutyronitrile
0.45 g. of formaldehyde (from polymeric formaldehyde) was warmed to above 50° C. and 50µl of dimethoxy-3,5-dimethyl-1-pyrazolylmethane (0.12 mol percent of chloral) added. The mixture was cast into a ⅛inch thick mold and cooled to 0° C. for one-half hour and then heated to 85° C. for one-half hour. The sheet obtained had a slightly yellow color, was stable to heat and had an impact (Izod) of 0.507 ft.lbs./in.notch.

EXAMPLE B

When the polymerization of Example A was carried out except the amide acetal was dimethylformamide dineopentyl acetal (0.07 ml percent), an opaque colorless sheet was obtained that had an impact value of 0.346.

It has been found that use of formaldehyde in small amounts of from about 1 to 10 mol percent in conjunction with from about 0.5 to 3 mol percent of a diaryl ketene, both based on the weight of chloral, gives rapid polymerization and composite polymers of good properties. In Examples A and B, 6 mol percent of formaldehyde was used, based on chloral.

EXAMPLE C

A mixture of
22 ml. of chloral,
13.8 ml. of methyl methacrylate, and
0.22 g. of azodiisobutyronitrile was cooled to about −20° and 0.1 g. of formaldehyde (from polymeric formaldehyde) was introduced in a gaseous nitrogen stream into the mixture. The mixture was then warmed to 50° with stirring under nitrogen and 50 μl of dimethoxy-3,5-dimethyl-1-pyrazolylmethane added. The mixture was then introduced into a ⅛ × 4 inch mold and the mold and contents cooled from 50° to 0° for 30 minutes then heated to 85° C. for 30 minutes. The polymeric product obtained was colorless. It had an impact (Izod) of 0.429 ft. lbs./in. notch and underwent little discoloration upon exposure to light and moisture.

EXAMPLE D

Five microliters of each of these amide acetals:
A. $Me_2NCH(OtBu)_2$ (see Ex. 3–7),
B. $Me_2NCH(OMe)_2$ (see Ex. 8),
C. $Me_2NCH(OBz)_2$ (see Ex. 10),
D. Dimethoxy-3,5-dimethyl-1-pyrazolylmethane, (see Ex. 19–23)
was employed together with 0.75 ml. of each of the following solutions to initiate polymerization of the chloral/isocyanate portions thereof at temperatures of between 0° to 60° C.

1. 37 vol. percent of methyl methacrylate
23.3 ml. of chloral
15.1 ml. of methyl methacrylate
2.9 ml. of p-chlorophenyl isocyanate
25 mg. of azodiisobutyronitrile (free-radical initiator)
2. 50 vol. percent of methyl methacrylate
15.4 ml. of chloral
17.5 ml. of methyl methacrylate
1.02 ml. of p-chlorophenyl isocyanate
35 mg. of azodiisobutyronitrile
3. 23 vol. percent of methyl methacrylate
28.8 ml. of chloral
9.4 ml. of methyl methacrylate
1.91 ml. of p-chlorophenyl isocyanate
23 mg. of azodiisobutyronitrile In each case, the amide acetal initiators and the solutions were cooled in an ice bath to effect chloral/isocyanate polymerization. When this polymerization was substantially complete, the ice was allowed to melt and the polymer/monomer/initiator mixtures were warmed to 70° C. for 25 hours and 100° C. for 1 hour to produce composite polymer compositions. Such composite polymer compositions were then isolated.

In certain instances, the methyl methacrylate portion of the single-phase composites has been polymerized not by heating but by irradiation. The irradiation procedure is generally conducted on samples in a quartz cell using light of about 2,537A.

Burning tests conducted on the composites, made as described above, show them to be self-extinguishing when removed from contact with an open flame. Self-extinguishing when removed from contact with an open flame. Self-extinguishing properties improve with an increase in the level of chloral that is present.

All of the polymers made by the process described herein are useful in building-product applications where heat stability and good weatherability are desired and in other applications where self-extinguishing properties are important. Composites are especially useful in building-product applications, either with or without added fillers. Such composites containing about 10 to 75 weight percent of ethylenically unsaturates addition monomer polymerized therein are especially preferred.

The embodiments of the invention in which an exclusive property or privilege is claimed are defined as follows:

1. A process for polymerizing chloral monomer together with up to 50 mole percent of at least one comonomer selected from the group consisting of

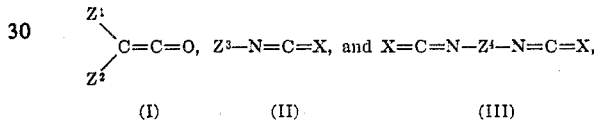

(I)  (II)  (III)

wherein:
X is selected from the group consisting of oxygen and sulfur;
$Z^1$ and $Z^2$, alike or different and separately or jointly, are selected from the group consisting of (1) monovalent groups selected from the group consisting of hydrogen, cyano, lower alkoxycarbonyl, and unsubstituted and substituted hydrocarbyl and hydrocarbyloxy in which any hydrocarbyl moiety is of one to 18 carbon atoms selected from the group consisting of alkyl, cycloalkyl, alkenyl, aryl, aralkyl and alkaryl, and any substituent is selected from the group consisting of lower-alkoxy, fluorine, chlorine, bromine, and iodine; and (2) divalent groups selected from alkylene of two to seven carbons;
$Z^3$ is selected from the group consisting of nonsubstituted and substituted alkyl, cycloalkyl, and alkenyl of up to 18 carbons, aryl of six to 18 carbons and alkaryl and aralkyl of seven to 24 carbons, any substitution being selected from the group consisting of fluorine, chlorine, bromine, iodine, nitro, cyano, phenylazo, $-NY_2$, $-OY$, $-SY$,

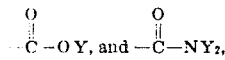

in which Y is lower alkyl or phenyl; and
$Z^4$ is selected from the group consisting of nonsubstituted and substituted alkylene, alkenylene, alkadienylene, alkarylene, aralkylene, cycloalkylene, alkylenebis(cycloalkylene), alkylenebis(arylene), arylene, arylenebis(alkylene) of up to 18 carbons and anthraquinonylene, any substitution being selected from the group consisting of fluorine, chlorine, bromine, iodine, nitro, cyano, phenylazo, —OY, —SY,

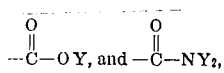

in which Y is loweralkyl or phenyl, comprising:
contacting monomer with an amide acetal polymerization initiator in an amount between 0.005 to 5 mol percent based on total charge, at a temperature of between about 0° to 60° C. the initiator having the formula

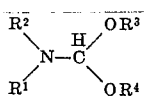

wherein
$R^1$ and $R^2$ are each lower hydrocarbyl of up to five carbons, or together form a divalent radical, containing four to five chain atoms, which is hydrocarbyl except that up to two hetero atoms can be nitrogen, oxygen, or sulfur,
$R^3$ and $R^4$ are each hydrocarbyl of less than eight carbons, or together form a divalent radical containing two to three chain carbon atoms, or are recurring units having an oxygen and up to eight carbons,
$R^1$ and $R^4$ can form divalent hydrocarbyl radicals of two to three carbons, and
$R^2$ and $R^3$ can form divalent hydrocarbyl radicals of two to three carbons.

2. A process according to claim 1, wherein one comonomer is a ketone.
3. A process according to claim 1, wherein one comonomer is an isocyanate.
4. A process according to claim 1, wherein one comonomer is an isothiocyanate.
5. A process according to claim 1, wherein one comonomer is a diisocyanate.
6. A process according to claim 1, wherein one comonomer is a diisothiocyanate.
7. A process according to claim 1, wherein chloral is the sole monomer.
8. A process according to claim 1, wherein the amide acetal initiator is of the formula

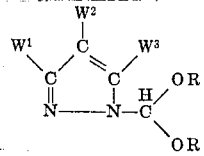

wherein:
R is lower alkyl of one to four carbon atoms, and $W^1$, $W^2$, $W^3$ are hydrogen or lower alkyl.
9. A process according to claim 1, wherein the monomer charge is about 60–80 mole percent chloral and 20–40 mole percent p-chlorophenyl isocyanate.
10. The process of claim 1, wherein the polymerization initiator is dimethylformamide dineopentyl acetal.
11. The process of claim 1, wherein the polymerization initiator is dimethoxy-3,5-dimethyl-1-pyrazolylmethane.
12. The process of claim 1, wherein the polymerization initiator is dimethylformamide di-t-butyl acetal.
13. The process of claim 1, wherein the polymerization initiator is dimethylformamide dibenzyl acetal.
14. The process of claim 1, carried out in the presence of an ethylenically unsaturated monomer polymerizable by a free-radical catalyst.
15. The process of claim 1, carried out in the presence of (a) an ethylenically unsaturated monomer polymerizable by a free-radical catalyst and (b) a free-radical catalyst, said monomer present in an amount by weight less than chloral.
16. The process of claim 15, including the step of polymerizing the ethylenically unsaturated monomer.
17. The process of claim 16, wherein the ethylenically unsaturated monomer is methyl methacrylate.
18. The process of claim 16, wherein the ethylenically unsaturated monomer is methyl acrylate.
19. The process of claim 16, wherein the ethylenically unsaturated monomer is vinyl acetate.
20. The process of claim 7, carried out in the presence of (a) an ethylenically unsaturated monomer polymerizable by a free-radical catalyst and (b) a free-radical catalyst, said monomer present in an amount by weight less than chloral.
21. The process of claim 20, including the step of polymerizing the ethylenically unsaturated monomer.
22. The process of claim 21, wherein the ethylenically unsaturated monomer is methyl methacrylate.

* * * * *